US009873429B1

(12) United States Patent
Gupta

(10) Patent No.: US 9,873,429 B1
(45) Date of Patent: Jan. 23, 2018

(54) TURNED-WHEEL DETECTION FOR YIELDING DURING LOW-SPEED LANE CHANGES

(71) Applicants: VOLKSWAGEN AG, Wolfsburg (DE); AUDI AG, Ingolstadt (DE)

(72) Inventor: Somudro Gupta, Belmont, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 15/205,210

(22) Filed: Jul. 8, 2016

(51) Int. Cl.
*B60W 30/09* (2012.01)
*B60W 50/14* (2012.01)
*G06G 1/16* (2006.01)
*G08G 1/16* (2006.01)

(52) U.S. Cl.
CPC ............ *B60W 30/09* (2013.01); *B60W 50/14* (2013.01); *G08G 1/166* (2013.01); *G08G 1/167* (2013.01); *B60W 2550/10* (2013.01); *B60W 2550/14* (2013.01); *B60W 2550/20* (2013.01); *B60W 2720/106* (2013.01); *B60W 2720/24* (2013.01)

(58) Field of Classification Search
CPC .. B60W 30/09; B60W 50/14; B60W 2720/24; B60W 2550/14; B60W 2550/10; B60W 2720/106; B60W 2550/20; G08G 1/166; G08G 1/167
USPC .......................................................... 701/41
See application file for complete search history.

(56) References Cited

U.S. PATENT DOCUMENTS

2014/0195093 A1  7/2014  Litkouhi et al.
2014/0232560 A1  8/2014  Hawkes et al.

FOREIGN PATENT DOCUMENTS

DE   102008061301 A1   6/2009
DE   102012218935 A1   4/2013

*Primary Examiner* — Brian P Sweeney
(74) *Attorney, Agent, or Firm* — Barnes & Thornburg LLP

(57) ABSTRACT

Systems, components, and methodologies are provided for improvements in operation of automotive vehicles by enabling monitoring analysis and reaction to subtle sources of information that aid in prediction and response of vehicle control systems across a range of automation levels. Such systems, components, and methodologies include wheel-turn detection equipment for detecting a wheel angle of another vehicle to trigger a vehicle control system to perform an operation based on the detected wheel angle of the other vehicle.

34 Claims, 5 Drawing Sheets

TURNED-WHEEL DETECTION FOR YIELDING DURING LOW-SPEED LANE CHANGES

FIELD

The present disclosure relates to systems, components, and methodologies for vehicle operation. More particularly, the present disclosure relates to systems, components, and methodologies for optimization of vehicle operation.

BACKGROUND

Automotive vehicles can operate with various levels of automation including for example, driver notification, driver assistance, and/or autonomous operation. Some vehicles with automation perform driving-related operations using information regarding the roadway. However, automated vehicle operation does not necessarily employ and/or account for certain conventional types of information, such as driver-to-driver communication.

SUMMARY

Accordingly, consideration of conventional sources of information can improve prediction and response of vehicle control systems across a range of automation levels. According to the present disclosure, systems, components, and methodologies are provided for improvements in operation of automotive vehicles.

Such systems, components, and methodologies may enable automotive vehicle operation on roadways, wherein an automotive vehicle may be controlled completely or partially by a vehicle control system for controlling operation of the vehicle on the roadways, wherein the vehicle control system includes wheel-turn detection equipment for detecting a wheel angle of another vehicle to trigger the vehicle control system to perform an operation based on the detected wheel angle of the other vehicle.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DISCLOSED EMBODIMENTS

Automotive vehicles can include a wide range of automation functionality modes ranging from information only to driverless operation. Automotive vehicles with such automation functionality modes can increase transportation related safety and efficiency.

Automotive vehicles with such automation functionality modes can obtain information such as indications of the presence and/or conditions of other vehicles on the roadway, conditions of the roadway itself, and/or obstacles (e.g., signs and/or obstructions) to determine and execute appropriate response to such information.

Conventional driver-to-driver communication provides opportunities to increase safety and efficiency through exchange of more subtle information, for example, certain aspects of roadway etiquette such as driver eye contact. However, such subtleties of roadway etiquette can be overlooked by vehicle control systems that govern the automation functionality modes. Nevertheless, monitoring, analyzing, and responding to subtle roadway communications can improve the driving experience, increase efficiency, and/or reduce safety risks.

Subtleties of roadway etiquette can be particularly helpful during low speed driving, for example, from about 0 to about 35 mph. In such scenarios, other vehicles on the roadway may indicate an intention to change lanes by first turning their wheels, perhaps for an extended period of time, before actually proceeding to change lanes. For example, when navigating through low speed, stopped, or near-stopped traffic, the wheels of another vehicle may be positioned at a significant angle before the other vehicle proceeds to enter a different lane. By detecting the wheel angle of the other vehicle as an indication of intention to change lanes, the automotive vehicle can increase efficiency, safety, and courtesy in vehicle operation.

Moreover, the wheel angle of other vehicles can be considered among other factors in predicting other vehicle action. Prediction of other vehicle action can compensate for the significance of the amount of wheel angle relative to various other factors. For example, at a speed of 50 mph the amount of wheel angle that indicates an intention to change lanes would expectedly be less than the amount of wheel angle that indicates an intention to change lanes at a speed of 2 mph. Accordingly, each degree of wheel angle at speed of 50 mph may affect the prediction of other vehicle action to a greater extent that a single degree of wheel angle at a speed of 2 mph. A vehicle control system which can detect and consider the wheel angle of other vehicles on the roadway can improve predictions of the actions of other vehicles and the responses thereto.

Figure 1:
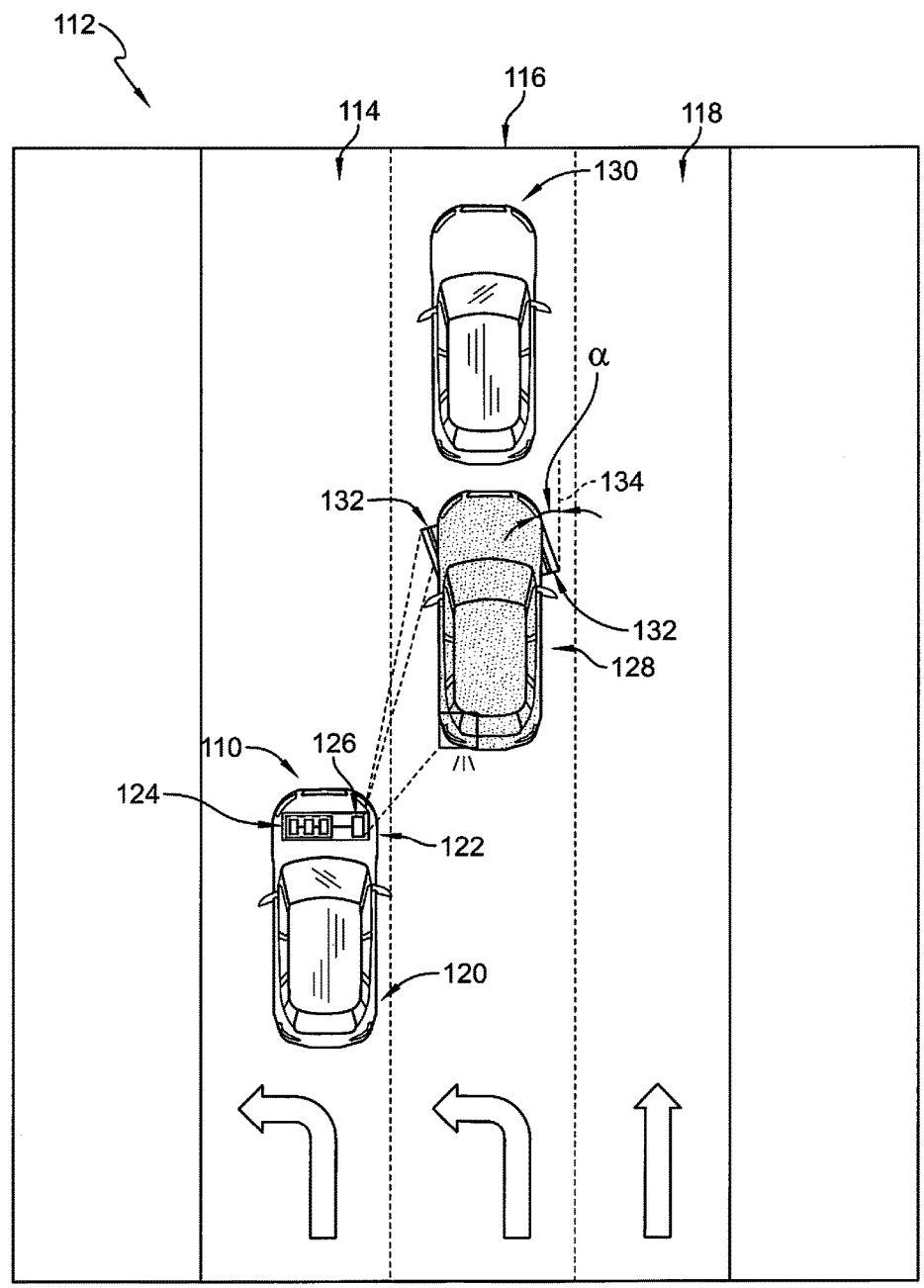
FIG. 1 is an overhead plan view of an automotive vehicle on a roadway showing that the automotive vehicle includes a vehicle base having a chassis and a drive train coupled to the chassis to propel the chassis along the roadway and a vehicle control system for controlling operation of the vehicle on the roadways and having a wheel-turn detection means for detecting a wheel angle of another vehicle on the roadway to trigger the vehicle control system to perform an operation based on the detected wheel angle of the other vehicle, for example, by determining whether the other vehicle is indicating an intention to change lanes on the roadway based on the detected wheel angle of the other vehicle.

An illustrative embodiment of an automotive vehicle 110 is shown in FIG. 1. The vehicle 110 is illustratively shown on a roadway 112 having multiple lanes 114, 116, 118, the vehicle 110 being illustratively positioned within lane 114. As shown in FIG. 1, the automotive vehicle 110 illustratively includes a chassis 120 and a drivetrain 122 coupled to the chassis 120 to propel the chassis along the roadway 112.

The automotive vehicle 110 may include a vehicle control system 124 for controlling operation of the vehicle 110 on the roadway 112. In the illustrative embodiment, the vehicle control system 124 may be mounted on the chassis 120 and is in communication with the drivetrain 122 to send and receive information. The vehicle control system 124 illustratively may include a wheel-turn detector 126 configured to detect a wheel angle of another vehicle 128.

In the illustrative embodiment shown in FIG. 1, other vehicles 128, 130 may be positioned within lane 116 of the roadway 112. The other vehicle 128 may include front wheels 132 that are illustratively arranged to be turned at an angle $\alpha$ from a reference line 134 of the lane 116. The reference line 134 may be arranged parallel with the trajectory of its lane 116 at the present location of the other vehicle 128 along the roadway 112. The wheel-turn detector 126 may detect the wheel angle $\alpha$ of the other vehicle 128 to trigger the vehicle control system 124 to perform an operation based on the detected wheel angle.

Figure 2:
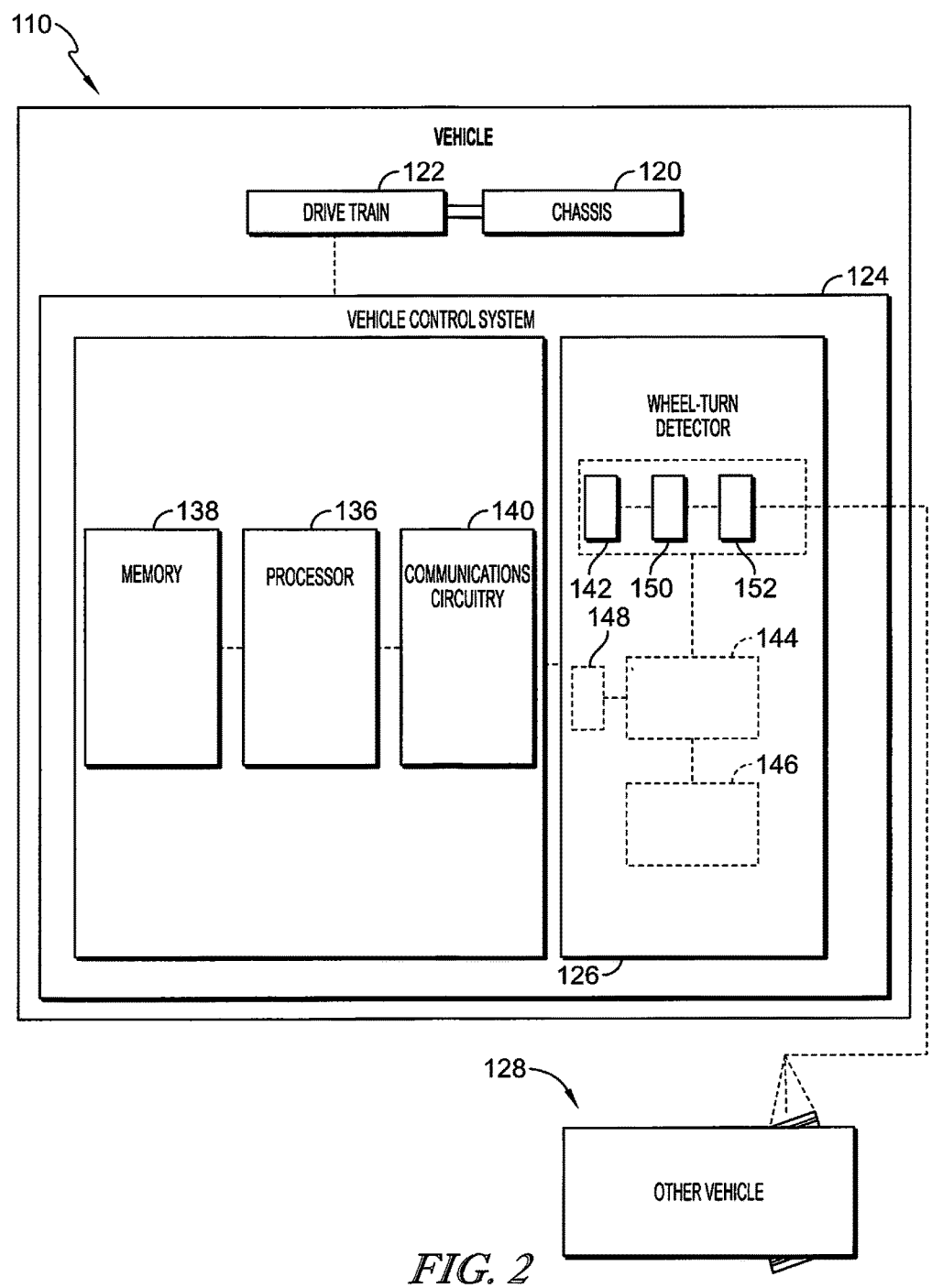
FIG. 2 is a diagrammatic view of the vehicle control system of the automotive vehicle of FIG. 1 showing that the vehicle control system is in communication with the drive train of the vehicle and showing that the wheel-turn detection means perceives an indication of a wheel angle of the other vehicle.

In the illustrative embodiment as shown in FIG. 2, the vehicle control system 124 may include a processor 136, memory device 138 for storing instructions, and communications circuitry 140 in communication with each other to conduct vehicle operations. The communications circuitry 140 may include hardware such as antennas, transmitters/receivers and/or other components for communicating signals and may be arranged to communicate signals with each of the drivetrain 122 and the wheel-turn detector 126. The processor 136 illustratively executes the instructions stored on the memory device 138 to determine vehicle operations based on the information received through the communications circuitry 140, and communicates vehicle operations to the drivetrain 122 through the communications circuitry 140. In some embodiments, the vehicle control system 124 may include any number, type, and/or arrangement of dedicated and/or shared hardware and/or software components in communication with various vehicle subsystems to conduct vehicle operations.

As shown in FIG. 2, the wheel-turn detector 126 may include a receiver 142 adapted to receive an indication of the wheel angle $\alpha$ of the other vehicle 128. The receiver 142 may include any of a camera that captures images, a detection and/or ranging device (for example, RADAR (Radio Detection and Ranging), LIDAR device (Light Detection And Ranging)), and/or any other suitable sensors, devices, and/or operators for detecting the wheel angle of the other vehicle 128. As shown in FIG. 2, the wheel-turn detector 126 may optionally include any of a processor 144, a memory device 146 storing instructions for execution on the processor 144, and communication circuitry 148 arranged to communicate with the vehicle control system 124.

The processor 144 may execute the instructions of the memory device 146 to determine the wheel angle from the information received by the receiver 142. In some embodiments, the wheel-angle detector 126 may share any number of hardware and/or software components with the vehicle control system 124, for example, any of the optional processor 144, memory device 146, and/or communication circuitry 148 may be eliminated and operations of may be performed by the processor 136, memory device 138, and/or communications circuitry 140. The receiver 142 of the wheel-angle detector 126 may comprise a transceiver and/or separate transmitters and receivers for sending and receiving communication signals, for example, for detection and/or ranging devices. In some embodiments, the receiver 142 may send a signal to the other vehicle 128 and receive a response signal therefrom indicating the wheel angle $\alpha$ of the other vehicle 128.

As shown in the illustrative embodiment of FIG. 2, the wheel-angle detector may include various other detectors 150, 152 for detecting other roadway parameters, for example, a velocity (v) (absolute and/or relative to other vehicle 130), a lane angle ($\varphi$), a turn signal ($\tau$) operation, and/or road topology features ($\eta_1, \eta_2, \ldots$) of the other vehicle 128. The other detectors 150, 152 may receive information from the other vehicle 128 indicating various roadway parameters for consideration by the vehicle control system 124 in conducting vehicle operations. The other detectors 150, 152 may include any of a camera that captures images, a detection and/or ranging device (for example, RADAR (Radio Detection and Ranging), LIDAR device (Light Detection And Ranging)), and/or any other suitable operators for detecting the particular roadway parameter.

Figure 3:
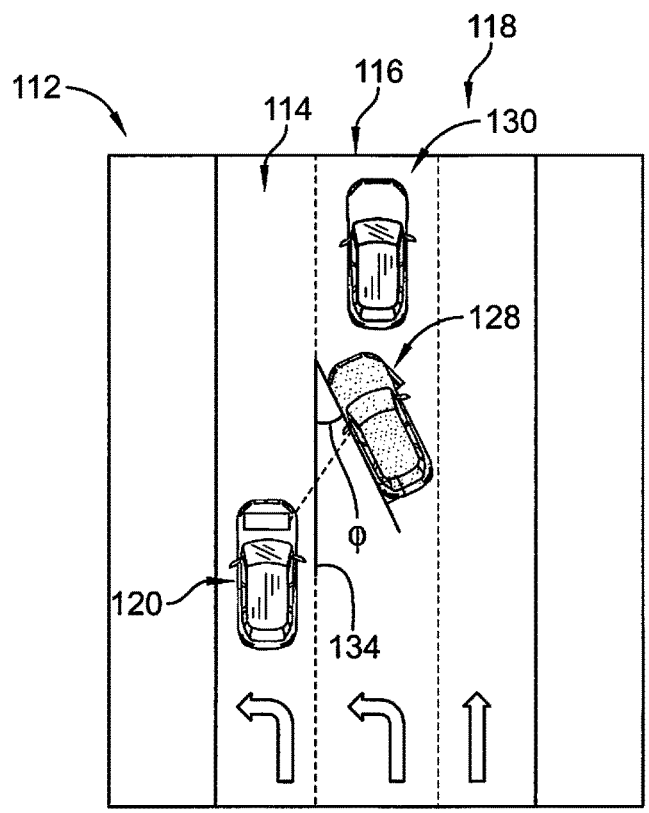
FIG. 3 is an overhead plan view of the automotive vehicle of FIGS. 1 and 2 showing that the vehicle control system determines whether the other vehicle is indicating an intention to change lanes on the roadway based on the lane angle of the other vehicle.

As shown in FIG. 3, the vehicle control system 124 may determine the lane angle $\varphi$ of the other vehicle 128 to indicate an intention of the other vehicle 128 to change lanes 114, 116, 118 of the roadway 112. The lane angle $\varphi$ of the other vehicle 128 may include the general angle of the other vehicle relative to the reference line 134. One of the other detectors 150, 152 may receive information indicating the lane angle $\varphi$ of the other vehicle 128. The vehicle control system 124 may determine and execute vehicle operations based on the lane angle $\varphi$ of the other vehicle 128 alone or in combination with the wheel-angle $\alpha$ of the other vehicle 128.

Figure 4:
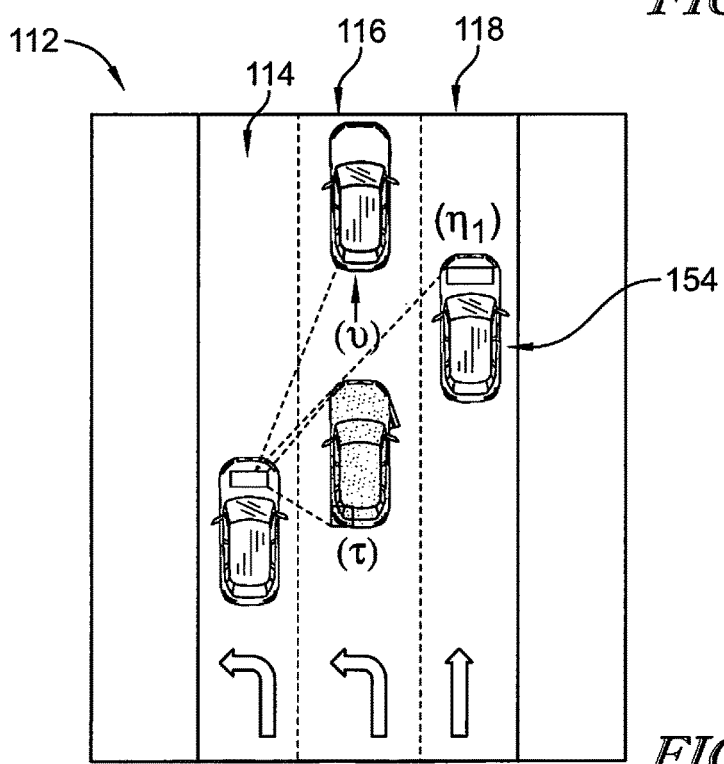
FIG. 4 is an overhead plan view of the automotive vehicle of FIGS. 1-3 showing that the vehicle control system determines whether the other vehicle is indicating an intention to change lanes on the roadway based on any of a turn signal operation of the other vehicle, a blockage (other vehicles) in the lane adjacent the other vehicle, and a speed of the other vehicle relative to still another vehicle immediately in front of the other vehicle.

As shown in FIG. 4, the vehicle control system 124 may determine the velocity v of the other vehicle 128 (absolute and/or relative to other vehicle 130) to indicate an intention of the other vehicle 128 to change lanes 114, 116, 118 of the roadway 112. One of the other detectors 150, 152 may receive information indicating the velocity v of the other vehicle 128 (absolute and/or relative to other vehicle 130). In the illustrative embodiment as shown in FIG. 4, the other vehicle 130 is immediately in front of the other vehicle 128. The vehicle control system 124 may determine and execute vehicle operations based on the velocity v (absolute and/or relative to other vehicle 130) alone or in combination with the wheel-angle $\alpha$ of the other vehicle 128. In some embodiments, the vehicle control system 124 may determine the absolute velocity of the other vehicle 130 in order to determine the velocity v of the other vehicle 128 relative to the other vehicle 130.

In the illustrative embodiment as shown in FIG. 4, the vehicle control system 124 may determine a turn signal $\tau$ operation to indicate an intention of the other vehicle 128 to change lanes 114, 116, 118 of the roadway 112. One of the other detectors 150, 152 may receive information indicating a turn signal τ of the other vehicle 128 is operational (i.e., flashing). The vehicle control system 124 may determine and execute vehicle operations based on the turn signal τ operation of the other vehicle 128 alone or in combination with the wheel-angle α of the other vehicle 128.

In the illustrative embodiment as shown in FIG. 4, the vehicle control system 124 may determine a road topology feature $\eta_1$ relative to the other vehicle 128 to indicate an intention of the other vehicle 128 to change lanes 114, 116, 118 of the roadway 112. One of the other detectors 150, 152 may receive information indicating a road topology feature $\eta_1$ relative to the other vehicle 128, for example, that the lane 118 immediately adjacent the other vehicle 128 (within lane 116) is blocked by another vehicle 154. Road topology features may include any imposition of roadway conditions including obstacles (whether relatively stationary, such as traffic cones, and/or dynamic, such as moving vehicles); signage and/or informational display; roadway law, regulation, and/or rules; weather conditions; surface conditions (loose gravel, bumps, bridges, etc.); communications between intelligent vehicle systems; and/or any other roadway condition information. The vehicle control system 124 may determine and execute vehicle operations based on the road topology feature $\eta_1$ relative to the other vehicle 128 alone or in combination with the wheel-angle α of the other vehicle 128.

In some embodiments, the vehicle control system 124 may determine and execute vehicle operations based on any one or more of the roadway parameters, for example, other roadway parameters, for example, the velocity (v) (absolute and/or relative to other vehicle 130), the lane angle (φ), the turn signal (τ) operation, and/or the road topology features ($\eta_1, \eta_2, \ldots$) of the other vehicle 128 alone or in combination with the wheel-angle α of the other vehicle 128. The vehicle control system 124 may determine whether the other vehicle 128 is indicating an intention to change lanes and may determine and execute a driving operation in response thereto.

Figure 5:
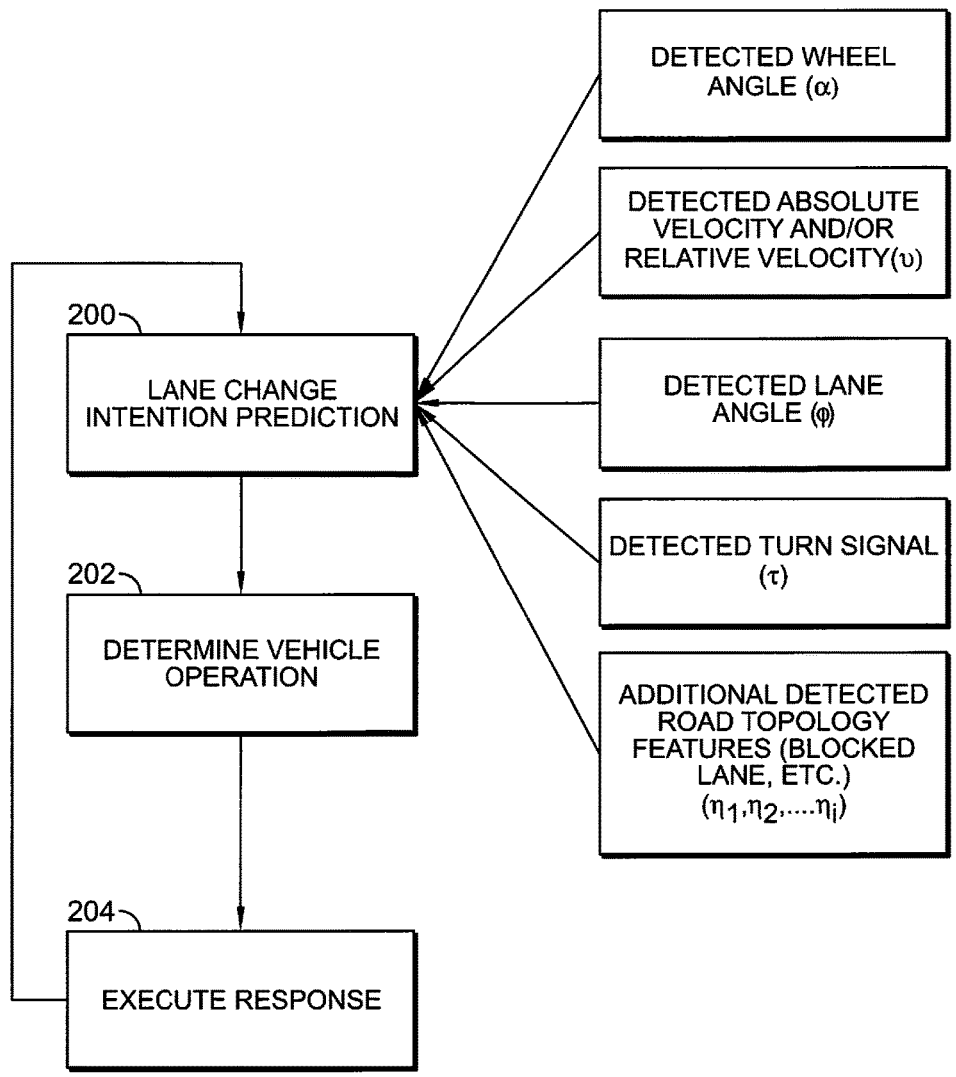
FIG. 5 is a flow diagram of the vehicle control system of the automotive vehicle of FIGS. 1-4 showing that the vehicle control system includes a lane change intention prediction module that performs a lane change intention prediction to determine whether the other vehicle is indicating an intent to change lanes.

As shown in the process flow diagram of FIG. 5, and described in detail below, operations performed at 200-204 illustrate one example of vehicle operations in accordance with the disclosed embodiments. At 200, the vehicle control system 124 may perform a lane change intention prediction. The vehicle control system 124 may receive indication of any of the detected wheel angle α, the velocity v (absolute and/or relative to other vehicle 130), a lane angle φ, a turn signal τ, and/or road topology features $\eta_1, \eta_2, \ldots \eta_i$ and may perform a lane change intention prediction based on one or more of the detected wheel angle α, the velocity v (absolute and/or relative to other vehicle 130), a lane angle φ, a turn signal τ, and/or road topology features $\eta_1, \eta_2, \ldots \eta_i$. The process illustratively may proceed to 202.

At 202, a vehicle operation is determined based on the lane change indication prediction. The vehicle control system 124 may determine the vehicle operation based on the lane change indication prediction of 200. The vehicle operation may illustratively include any one or more of a determination to issue an alert to the driver of the vehicle 110 and a determination of a responsive maneuver according to one or more of the detected wheel angle α, the velocity v (absolute and/or relative to other vehicle 130), the lane angle φ, the turn signal τ, and/or the road topology features $\eta_1, \eta_2, \ldots \eta_i$. The responsive maneuver may include one or more of maintaining course and/or speed, slowing the speed of the vehicle 110, increasing the speed of the vehicle 110, changing lanes 114, 116, 118, of the roadway 112, and/or any other active and/or passive operational maneuvers. The process illustratively may proceed to 204.

At 204, the vehicle control system 124 executes the determined vehicle operation. In the illustrative embodiment, the vehicle control system 124 communicates with the drivetrain 122 to perform the determined vehicle operation. The process illustratively may return to 200.

In the illustrative embodiment, the vehicle control system 124 may determine whether the other vehicle 128 indicates an intention to change lanes on the roadway based on the whether the detected wheel angle α exceeds a threshold wheel angle $\alpha_0$. The threshold wheel angle $\alpha_0$ may be a predetermined angle based on any of a speed of the automotive vehicle 110, a velocity v of the other vehicle 128 (absolute and/or relative to other vehicle 130), a lane angle φ of the other vehicle 128, a turn signal τ operation of the other vehicle 128, and road topology features η.

Figure 6:
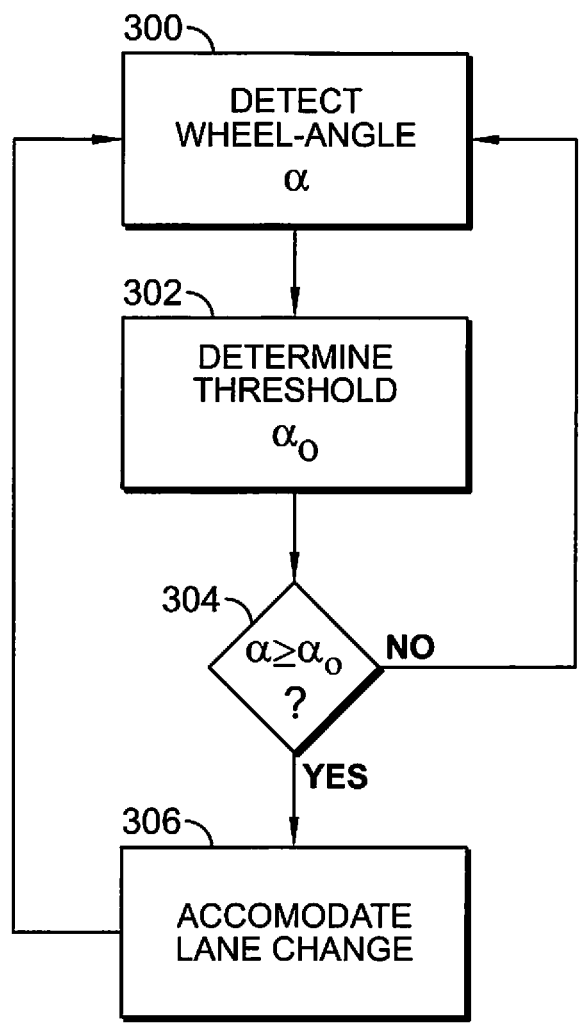
FIG. 6 is a flow diagram of the automotive vehicle of FIGS. 1-5 showing that the vehicle control system includes a threshold change prediction module that determines a threshold wheel angle of the other vehicle that is relevant to determining that the other vehicle is indicating an intention to change lanes.

As shown in the process flow diagram of FIG. 6, and described in detail below, operations 300-306 illustrate one example of vehicle operations in accordance with the disclosed embodiments. At 300, the wheel angle α of the other vehicle 128 is detected. In the illustrative embodiment, the wheel-angle detector 126 receives information regarding the wheel angle α of the other vehicle 128, determines the detected wheel angle α, and sends a signal indicating the detected wheel angle α to the communications circuitry 140 of the vehicle control system 124. The process illustratively may proceed to 302.

At 302, the threshold wheel angle $\alpha_0$ is determined. In the illustrative embodiment, the vehicle control system 124 may determine the threshold wheel angle $\alpha_0$ based on any of a velocity of the automotive vehicle 110, a velocity v of the other vehicle 128 (absolute and/or relative to other vehicle 130), a lane angle φ of the other vehicle 128, a turn signal τ operation of the other vehicle 128, and road topology features η as inputs to the instructions stored within the memory device 138 and executed by the processor 136. The vehicle control system 124 may store the resultant threshold wheel angle $\alpha_0$ in the memory device 138. The process illustrative illustratively may proceed to 304.

At 304, the detected wheel angle α is compared to the threshold wheel angle $\alpha_0$. The vehicle control system 124 may compare the detected wheel angle α to the threshold wheel angle $\alpha_0$. If the processor 136 determines that the detected wheel angle α is less than the threshold wheel angle $\alpha_0$, the process may return to 300. If instead, the processor 136 determines that the detected wheel angle α is equal to or greater than the threshold wheel angle $\alpha_0$, a determination is made that the other vehicle 128 indicates an intention to change lanes 114, 116, 118 of the roadway 112, and the process may proceed to 306.

At 306, the vehicle accommodates the lane change of the other vehicle 128. The vehicle control device 124 determines and executes a vehicle operation as discussed above. In some embodiments, the vehicle control system 124 may determine and apply multiple thresholds wheel angles to determine the appropriate vehicle operation, for example, if the detected wheel angle α exceeds the threshold wheel angle $\alpha_0$ by a predetermined amount, a more aggressive vehicle operation may be determined and executed. The process may illustratively return to 300.

In the illustrative embodiment, the vehicle control system 124 can determine vehicle operation based on magnitude of the wheel angle α of the other vehicle 128 including, for example, whether the wheels 132 of the other vehicle 128 are pointed toward or away from the lane 114 of the automotive vehicle 110. The vehicle control system 124 may consider the magnitude of the wheel angle α as one factor in determining whether the other vehicle 128 indicates an intention to change lanes and/or appropriate vehicle operation in response to that determination.

In the illustrative embodiment, the instructions stored on memory devices may be embodied as algorithms for execution using inputs, but in some embodiments, may include look-up tables, and/or other computational instruments. In the illustrative embodiments, hardware and/or software may be wholly and/or partly shared between system components, and communications between components may be wholly or partly wired and/or wireless. In the illustrative embodiments, component hardware and/or software for performing the described functions may be implied.

Disclosed embodiments include and/or utilizes devices, systems, and methods for turned wheel detection for yielding during low-speed lane changes. A challenge of autonomous driving systems involves social cooperation with the drivers of other vehicles, especially in low-speed/dense traffic situations. Disclosed embodiments address, among other things, specific scenarios in which a neighboring driver is at low speed or is stopped (or close to stopped) but wants to come into the lane of the present vehicle. Driving etiquette may be to accommodate (leave a gap in front, or potentially move up or over early) so that the neighboring vehicle can enter the lane. Existing driver assistance/autonomous driving systems may fail to do this.

The devices, systems, and methods of Disclosed embodiments can be useful when both the present vehicle and other vehicle are in turn-only lanes as shown in FIG. 1—in this case, detecting the other vehicle's turn signal may not be enough, as the turn signal should be turned on anyway, without necessarily indicating a desire for a lane change (as the other vehicle may be signaling the intent to turn with the turn lane, and not to change lanes). By analysis of more subtle information, such as the wheel angle, the overt indication of the turn signal (which may be a misnomer) can be more precisely assessed. Thus, the indication of intent of another vehicle to change lanes can be more accurately determined and responsive vehicle operation can increase in efficiency. The devices, systems, and methods of Disclosed embodiments can increases safety in highway and urban traffic jams, where low speed cut-ins are prevalent, although operation can provide benefits at a range of speeds from stopped to high speed.

Disclosed embodiments address a technical problem that is new and particular to the technology of the automotive industry and a new research area in vehicle automation functionality modes. Existing approaches to driver assistance and vehicle automation merely utilize detected lateral velocity and/or turn signals to detect potential cut-ins in front of a vehicle. However, such conventional approaches fail to monitor for, detect, analyze or respond to other indications of driver intent so as to improve vehicle environment safety. Disclosed embodiments address this technical problem with the technical solution of detecting an indication of potential intent, in another vehicle, to change lanes or otherwise change vehicle travel direction that is inconsistent with that vehicle's orientation, e.g., by detecting turned front wheels of other vehicles in relationship to the vehicle orientation so as to determine vehicle a predictive indication of future movement of those vehicles. Disclosed embodiments may include cameras, lidar, radar, and/or other suitable detection devices and methods to detect the turned front wheel of other vehicles in a neighboring lane on the roadway, for example, at low-speed and/or stopped. If the wheel of the other vehicle is turned toward the present vehicle, it may indicate that the driver of that vehicle (or the operation system) intends to come into the lane of the present vehicle.

Disclosed embodiments are based on the recognition that analysis of the wheel turn can be more reliable and/or a confirming or contradicting indication of future travel direction by the vehicle than detecting a turn signal. For example, if the other vehicle is in a turn-only lane, the signal may simply indicate that the other vehicle will turn along with its current lane, and not necessarily, that the other vehicle will perform a lane change. As a result, detecting, analyzing and responding to such wheel turn data enables improved operation and safety of driver assist or automation functionality and systems.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, disclosed embodiments are deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. An automotive vehicle for operation on roadways, the automotive vehicle comprising:
   a vehicle base including a chassis and a drive train coupled to the chassis to propel the chassis along the roadways, and
   a vehicle control system for controlling operation of the vehicle on the roadways, the vehicle control system being mounted to the vehicle base and in communication with the drive train and including wheel-turn detection means for detecting a wheel angle of another vehicle to trigger the vehicle control system to perform an operation based on the detected wheel angle of the another vehicle, wherein the operation of the vehicle control system comprises issuing an alert to a driver of the vehicle and/or controlling operation of the vehicle to yield in response to determination that the another vehicle intends to change lanes.

2. The automotive vehicle of claim 1, wherein the automotive vehicle is an automated vehicle.

3. The automotive vehicle of claim 1, wherein the vehicle control system determines whether the another vehicle is indicating an intention to change lanes on the roadway based on the detected wheel angle.

4. The automotive vehicle of claim 3, wherein the vehicle control system determines whether the another vehicle is indicating an intention to change lanes based on a determination that the detected wheel angle exceeds a threshold wheel angle.

5. The automotive vehicle of claim 4, wherein the vehicle control system determines the threshold wheel angle based on at least one of a speed of the automotive vehicle, a speed of the another vehicle, a speed of the another vehicle relative to a vehicle immediately in front of the another vehicle, a lane angle of the another vehicle, an operation of a turn signal of the another vehicle, and a road topology feature.

6. The automotive vehicle of claim 3, wherein the vehicle control system determines whether the another vehicle is indicating an intention to change lanes based on at least one of a speed of the another vehicle relative to a vehicle immediately in front of the another vehicle, a lane angle of the another vehicle, an operation of a turn signal of the another vehicle, and a road topology feature.

7. The automotive vehicle of claim 6, wherein the detected road topology feature includes a blockage in a lane adjacent to the another vehicle.

8. The automotive vehicle of claim 1, wherein the wheel-turn detection means includes at least one of a camera, a lidar device, and a radar device.

9. The automotive vehicle of claim 1, wherein the operation of the vehicle control system comprises determining and executing a responsive maneuver based on at least one of the determined wheel angle, a speed of the automotive vehicle, a speed of the another vehicle, and a road topology feature.

10. The automotive vehicle of claim 9, wherein the responsive maneuver includes at least one of slowing down and changing lanes of the roadway.

11. The automotive vehicle of claim 1, wherein detecting a current wheel angle includes receiving information one at least one of a camera, a lidar device, and a radar device.

12. A method of operating an automotive vehicle on a roadway, the method comprising:
    detecting a current wheel angle of another vehicle on the roadway; and
    triggering a vehicle operation based on the detected wheel angle of the another vehicle, wherein the vehicle operation comprises issuing an alert to a driver of the vehicle and/or controlling operation of the vehicle to yield in response to determination that the another vehicle intends to change lanes.

13. The method of claim 12, wherein triggering a vehicle operation includes determining whether the another vehicle indicates an intention to change lanes on the roadway based on the current wheel angle and in response to determination that the another vehicle intends to change lanes, determining and executing a response maneuver.

14. The method of claim 13, wherein determining whether the another vehicle is indicating an intention to change lanes includes is based on at least one of a speed of the another vehicle relative to a vehicle immediately in front of the another vehicle, a lane angle of the another vehicle, an operation of a turn signal of the another vehicle, and a road topology feature.

15. The method of claim 13, wherein determining whether the another vehicle indicates an intention to change lanes on the roadway based on the current wheel angle includes determining whether the detected wheel angle exceeds a threshold wheel angle.

16. The method of claim 15, further comprising determining the threshold wheel angle based on at least one of a speed of the automotive vehicle, a speed of the another vehicle, a speed of the another vehicle relative to a vehicle immediately in front of the another vehicle, a lane angle of the another vehicle, an operation of a turn signal of the another vehicle, and a road topology feature.

17. The method of claim 12, wherein the vehicle operation includes determining and executing a responsive maneuver based on at least one of the determined wheel angle, a speed of the automotive vehicle, a speed of the another vehicle, and a road topology feature.

18. The method of claim 17, wherein the responsive maneuver includes at least one of slowing down and changing lanes of the roadway.

19. An automotive vehicle for operation on roadways, the automotive vehicle comprising:
    a vehicle base including a chassis and a drive train coupled to the chassis to propel the chassis along the roadways, and
    a vehicle control system for controlling operation of the vehicle on the roadways, the vehicle control system being mounted to the vehicle base and in communication with the drive train and including a wheel-turn detection device configured to detect a wheel angle of another vehicle and to communicate an indication of the detected wheel angle with the vehicle control system to perform an operation based on the detected wheel angle of the another vehicle, wherein the operation of the vehicle control system comprises issuing an alert to a driver of the vehicle and/or controlling operation of the vehicle to yield in response to determination that the another vehicle intends to change lanes.

20. The automotive vehicle of claim 19, wherein the vehicle control system determines whether the another vehicle is indicating an intention to change lanes based on a determination that the detected wheel angle exceeds a threshold wheel angle.

21. The automotive vehicle of claim 20, wherein the vehicle control system determines the threshold wheel angle based on at least one of a speed of the automotive vehicle, a speed of the another vehicle, a speed of the another vehicle relative to a vehicle immediately in front of the another vehicle, a lane angle of the another vehicle, an operation of a turn signal of the another vehicle, and a road topology feature.

22. The automotive vehicle of claim 19, wherein the vehicle control system determines whether the another vehicle is indicating an intention to change lanes based on at least one of a speed of the another vehicle relative to a vehicle immediately in front of the another vehicle, a lane angle of the another vehicle, an operation of a turn signal of the another vehicle, and a road topology feature.

23. The automotive vehicle of claim 22, wherein the detected road topology feature includes a blockage in a lane adjacent to the another vehicle.

24. The automotive vehicle of claim 19, wherein the wheel-turn detection device includes at least one of a camera, a lidar device, and a radar device.

25. The automotive vehicle of claim 19, wherein the operation of the vehicle control system comprises determining and executing a responsive maneuver based on at least one of the determined wheel angle, a speed of the automotive vehicle, a speed of the another vehicle, and a road topology feature.

26. The automotive vehicle system of claim 25, wherein the responsive maneuver includes at least one of slowing down and changing lanes of the roadway.

27. A vehicle operation system for determining the wheel angle of vehicles on a roadway, the wheel-turn detection system comprising:
   a vehicle control system for controlling operation of an automotive vehicle on the roadways,
   a wheel-turn detection device in communication with the vehicle control system, the wheel-turn detection device being configured to detect a wheel angle of another vehicle on the roadway and to communicate an indication of the detected wheel angle of the another vehicle with the vehicle control system to trigger an operation based on the detected wheel angle of the another vehicle, wherein the triggered operation comprises issuing an alert to a driver of the vehicle and/or controlling operation of the vehicle to yield in response to determination that the another vehicle intends to change lanes.

28. The vehicle operation system of claim 27, wherein the vehicle control system determines whether the another vehicle is indicating an intention to change lanes based on a determination that the detected wheel angle exceeds a threshold wheel angle.

29. The vehicle operation system of claim 28, wherein the vehicle control system determines the threshold wheel angle based on at least one of a speed of the automotive vehicle, a speed of the another vehicle, a speed of the another vehicle relative to a vehicle immediately in front of the another vehicle, a lane angle of the another vehicle, an operation of a turn signal of the another vehicle, and a road topology feature.

30. The vehicle operation system of claim 27, wherein the vehicle control system determines whether the another vehicle is indicating an intention to change lanes based on at least one of a speed of the another vehicle relative to a vehicle immediately in front of the another vehicle, a lane angle of the another vehicle, an operation of a turn signal of the another vehicle, and a road topology feature.

31. The vehicle operation system of claim 30, wherein the detected road topology feature includes a blockage in a lane adjacent to the another vehicle.

32. The vehicle operation system of claim 27, wherein the wheel-turn detection device includes at least one of a camera, a lidar device, and a radar device.

33. The vehicle operation system of claim 27, wherein the triggered operation comprises determining and executing a responsive maneuver based on at least one of the determined wheel angle, a speed of the automotive vehicle, a speed of the another vehicle, and a road topology feature.

34. The vehicle operation system of claim 33, wherein the responsive maneuver includes at least one of slowing down and changing lanes of the roadway.

* * * * *